(12) United States Patent
Dakowski et al.

(10) Patent No.: US 8,133,010 B2
(45) Date of Patent: Mar. 13, 2012

(54) TURBINE STATOR FOR AIRCRAFT TURBINE ENGINE INCLUDING A VIBRATION DAMPING DEVICE

(75) Inventors: Mathieu Dakowski, Sucy en Brie (FR); Sandrine Gandelot, Montrouge (FR); Eric Jacques Lefebvre, Champigny (FR)

(73) Assignee: SNECMA, Paris (FR)

( * ) Notice: Subject to any disclaimer, the term of this patent is extended or adjusted under 35 U.S.C. 154(b) by 760 days.

(21) Appl. No.: 12/247,462

(22) Filed: Oct. 8, 2008

(65) Prior Publication Data
US 2009/0097971 A1 Apr. 16, 2009

(30) Foreign Application Priority Data
Oct. 11, 2007 (FR) ..................................... 07 58225

(51) Int. Cl.
*F04D 29/66* (2006.01)
(52) U.S. Cl. ..................................... 415/119; 415/174.5
(58) Field of Classification Search .................. 415/119, 415/174.5
See application file for complete search history.

(56) References Cited

U.S. PATENT DOCUMENTS
6,969,239 B2 * 11/2005 Grant et al. ............... 416/220 R FOREIGN PATENT DOCUMENTS
| EP | 0 785 338 A1 | 7/1997 |
| EP | 1 211 381 A1 | 6/2002 |
| EP | 1 441 108 A2 | 7/2004 |
| EP | 1 785 651 A1 | 5/2007 |

* cited by examiner

*Primary Examiner* — Quoc Hoang
(74) *Attorney, Agent, or Firm* — Oblon, Spivak, McClelland, Maier & Neustadt, L.L.P.

(57) ABSTRACT

A turbine stator for an aircraft turbine engine is disclosed. The turbine stator includes a stator wall supporting a high pressure air injector fixed on the downstream side, and an annular abradable element support. The lower radial end of the element support is fixed to the high pressure air injector and the upper radial end of the element support is fixed to the stator wall, such that they jointly delimit a cavity under pressure. The turbine stator also includes at least one vibration damping device located in the cavity under pressure. The vibration damping device is in contact with each of the two elements taken among the stator wall and the annular support.

9 Claims, 5 Drawing Sheets

TURBINE STATOR FOR AIRCRAFT TURBINE ENGINE INCLUDING A VIBRATION DAMPING DEVICE

TECHNICAL DOMAIN

This invention relates in general to a turbine stator for an aircraft turbine engine, and to a turbine in a turbine engine comprising such a stator, preferably a high pressure turbine.

The invention also relates to a turbine engine for an aircraft provided with at least one such turbine, the turbine engine preferably being a turbojet or a turboprop.

STATE OF PRIOR ART

FIG. 1 shows a partial view of an aircraft turbine engine 1 comprising a turbine 2 in a conventional embodiment according to prior art. In this figure, the turbine 2 corresponds to a high pressure turbine in the turbine engine called the HP turbine, in this case the turbine engine being in the form of a turbojet for an aircraft.

The turbine 2, located on the downstream side of a combustion chamber 3 of the turbojet, comprises a stator 5 and a rotor 7, the rotor being globally located on the downstream side of stator 5. In this respect, note that the terms <<downstream>> and <<upstream>> used in this description should be considered in relation to a main gas flow direction through the turbine engine, referenced diagrammatically by arrow 9, this direction being approximately parallel to a longitudinal axis 6 of the turbojet, simultaneously corresponding to an axis of the stator 5 and an axis of the rotor 8 of the turbine.

The rotor 7 comprises a main rotor disk called the blade support disk 8 with axis 6, passing through a system of axes 10 of the turbojet, due to the presence of a reaming 12 made in a known manner at a widened internal radial portion 14 forming the thickest part of the disk 8.

Turbine blades 22 through which gases escaping from the combustion chamber 2 can expand are mounted at an external radial end portion 20 of the disk 8.

There is an annular connecting flange 24 installed on the downstream side 23 of the blade support disk 8, used to attach this disk 8 to a downstream part of the turbine, not shown. There is also another annular connecting flange 28 installed on the upstream side 26 of the blade support disk 8, used to attach this disk 8 to another module of the turbine engine, and more specifically to the high pressure compressor, called the HP compressor 27, that itself comprises a downstream annular connecting flange 30. Once again, the upstream annular connecting flange 28 projects from the upstream side 26 with which it is made in a single piece, at a part located above the widened internal radial portion 14.

Apart from its function of assembly with the HP compressor, this annular upstream connecting flange 28 is also used to install a labyrinth disk 32 located on the upstream side of the blade support disk 8, one of the functions known to those skilled in the art being to assist with cooling this disk 8 and the blades supported on it. To perform this function, the disk 32 comprises one or several annular sealing labyrinths 34, forming sealing devices tangent to abradable annular elements 35 provided on the stator 5, also called friction elements. This defines an annular space 36 under pressure on the upstream side, by means of disk 32. Thus, fresh air entering this space 36 passes through the disk 32 before following the upstream side 26 of the disk 8 and then radially joins the outer part of a main air circuit through blades 22, as shown diagrammatically by the arrow 38 in FIG. 1.

In the implementation shown, the labyrinth disk 32 is arranged between the two annular connecting flanges 28, 30 to which it is fixed using bolts 40 used to assemble the two flanges, and distributed all around the axis 6. The labyrinth disk 32 also passes through the system of axes 10 of the turbojet, due to the presence of a reaming 44.

Concerning the stator 5 further on the upstream side, the stator includes firstly an annular stator wall 46 located nearby and on the downstream side of a combustion chamber bottom 48. A high pressure air injector 50 with an annular output oriented facing the through orifices 52 formed in the labyrinth disk 32 located on the downstream side, is fixed to the downstream side of the wall 46 and preferably close to the internal end of the wall.

Furthermore, at least one of the abradable elements 35 is fixed onto an annular support 54 forming part of the stator 5. In the configuration shown, this annular support carries the abradable element 35 forming the outermost sealing device in the radial direction, together with its associated labyrinth 34. In this respect, note that the second innermost sealing device is formed using an abradable element 35 installed fixed on the injector 50, and being oriented radially inwards so as to be tangent to its associated internal labyrinth 34 of the disk 32.

The support 54, arranged on the downstream side of the stator wall 46 preferably forming a single piece with injector 50, is fixed at its lower radial end 54a to the high pressure air injector 50, preferably at an outlet from this injector, for example by welding or riveting or any other appropriate means. It is also fixed at its upper radial end 54b to the stator wall 46, for example by bolting or any other appropriate means. Thus, the annular support 54, the stator wall 46 and the high pressure air injector 50 jointly form a cavity 58 under pressure through which air under pressure can pass, as will be described below.

Furthermore, the inner sealing device 34, 35 partly delimits a boundary between the annular space 36 and an upstream cavity 60 adjacent to it, while the outer sealing device 34, 35 located between the ends 54a, 54b of the support 54 partly delimits a boundary between the space 36 and said cavity 58 under pressure also adjacent to it. These cavities 58, 60 are separated from each other in the radial direction by the injector 50.

Note that the stator has another annular cavity 62 separated from the cavity 58 by the support 54, on the downstream side of the cavity 58 along the main annular flow path direction, through holes 64 being formed in the support to enable air communication between the cavities 58, 62. As can be seen in FIG. 1, the cavity 62 is located on the downstream side of the cavity 58 and communicates with the air passage located between the turbine disk 8 and its blades 22.

The injector 50 is made so as to draw in fresh air from a stator cavity 66 delimited on the downstream side by the combustion chamber bottom 48. As shown by the arrow 38, air located in the stator cavity 66 passes through the bottom 48 provided with appropriate through holes, then passes through other through passage orifices in a radially inner part of the stator wall 46, before entering the injector 50. Fresh air ejected from the injector then enters the space 36, and then passes through the orifices 52 before following the upstream side 26 of disk 8, to join the radially outer part of the main air circuit through blades 22.

For guidance, the injector 50 may be in any shape known to those skilled in the art, such as the <<blade>> shape, in which the air flow from the stator cavity 66 is made tangent to the rotor 7. In this case, the injector 50 is then equivalent to a conventional axial distributor, thus creating better air conditions than if air were forced to pass through inclined drillings, however this solution could be selected. The direct consequence of using such a system is elimination of the splatter effect due to the jet on the labyrinth disk 32, which is an important source of heating of blade supply air.

The stator 5 may comprise means of evacuating leakage air originating from the internal sealing device 34, 35, so as to evacuate air from the cavity 60 adjacent to the space 36, into the cavity 58 at a lower pressure. These air evacuation means may be in the form of holes 70 formed in the injector 50, for example in the radial direction. Thus, leakage air enters the cavity 60 is directed towards the cavity 58, passing through the holes 70, and then goes through the holes 64 in order to join the cavity 62 and the main flow path, as shown diagrammatically by arrow 72.

During operation, the various loads may initiate a self-sustained vibrational response to the dynamic interaction between the rotor 7 and the stator 5 that can be destructive for either or both of these two elements. In this respect, note that the interaction risk is usually determined by calculation. Depending on the calculated risks, the usual principle is to stiffen the components of the rotor and/or the stator, or to make them more flexible. However, these operations may not be sufficient to totally eliminate all interaction risks, such that it may be necessary to use other techniques.

OBJECT OF THE INVENTION

Therefore, the purpose of the invention is to correct the disadvantage mentioned above with embodiments according to prior art.

To achieve this, the first object of the invention is a turbine stator for an aircraft turbine engine, including:
  a stator wall, supporting a high pressure air injector fixed on the downstream side; and
  an annular abradable element support designed to be contacted by a sealing labyrinth, the lower radial end of said support arranged on the downstream side of said stator wall being fixed to said high pressure air injector, and its upper radial end being fixed to said stator wall, such that said annular support, said stator wall and said high pressure air injector jointly delimit a cavity under pressure.

According to the invention, the stator also comprises at least one vibration damping device located in said cavity under pressure, said vibration damping device being in contact with each of the two elements taken among said stator wall and said abradable annular element support.

Thus, the damping device limits vibrations applied to the turbine stator in operation, firstly due to its attachment to the stator wall, and secondly to its attachment to the annular support on the downstream side. This specific position was selected following the observation that the various loads encountered during operation generated a strong vibration response at the stator wall and at the annular abradable element support. Furthermore, the fact of reducing vibrations on these two particular parts partially reduces the vibrational response of the stator assembly, and the associated turbine rotor. Consequently, the invention advantageously provides a simple solution for limiting the dynamic vibrational interaction between the rotor and the stator to a reasonable level. In this respect, the damping device may be in any appropriate form such as one or several plates, or elastic means such as springs, etc.

Preferably, as has just been mentioned, the vibration damping device is in the form of a plate located in said cavity under pressure and with a first end fixed onto one of the two elements among said stator wall and said annular abradable element support, and a second free end held in contact with the other of said two elements.

This particular configuration globally stiffens the assembly including the two stator elements connected by such a plate, and more generally stiffens and limits vibrations of the stator assembly. Furthermore, since the second free end is only bearing in contact with its associated stator element, it is actually mobile and can therefore rub on it, which enables damping of vibrations by friction between the two parts.

The damping plate(s) may be in any appropriate shape. For example, it may consist of several plates shaped like blades distributed around the turbine axis, each blade extending approximately along the axial direction between its two ends, one end of which remains only supported on its contact element to benefit from damping of vibrations by friction. In this case the blades may be curved, particularly at the second free end simply by bearing, so as to facilitate its contact by friction with its associated stator element.

However, one preferred embodiment consists of including an annular vibration damping plate centred on a longitudinal axis of the stator and located in said cavity under pressure, said first and second ends corresponding to annular ends of said plate.

Preferably, said plate is perforated to allow air circulation through it, and therefore to provide an air passage between the two compartments of the cavity under pressure, delimited by this plate.

One alternative solution for fresh air to pass from one of the two compartments to the other, that can possibly be combined with the previous solution, is to shape said second end held in contact with said other of the two elements so as to have alternating lobes bearing in contact with said other of the two elements, and indentations that allow air to pass through, along a circumferential direction.

Preferably, said plate has a curved half cross-section, for example generally a U or C cross-section.

For maximum damping efficiency of vibrations by friction, the stator may be designed such that considering its half cross-section, a contact force between the second end and said other of the two elements is locally approximately orthogonal to a surface of said plate.

Another purpose of the invention is a turbine for an aircraft turbine engine comprising a stator like that described above, the turbine preferably being a high pressure turbine.

Finally, the invention also relates to an aircraft turbine engine comprising such a turbine.

Other advantages and characteristics of the invention will become clear in the non-limitative description given below.

BRIEF DESCRIPTION OF THE DRAWINGS

This description will be made with reference to the attached drawings among which:

FIG. 3b shows a partial perspective view of the annular vibration damping plate fitted on the turbine stator shown in FIG. 3a;

FIG. 4b shows a partial perspective view of the annular vibration damping plate fitted on the turbine stator shown in FIG. 4a;

FIG. 5b shows a sectional view along line Vb-Vb in FIG. 5a.

DETAILED DESCRIPTION OF PREFERRED EMBODIMENTS

Figure 1:
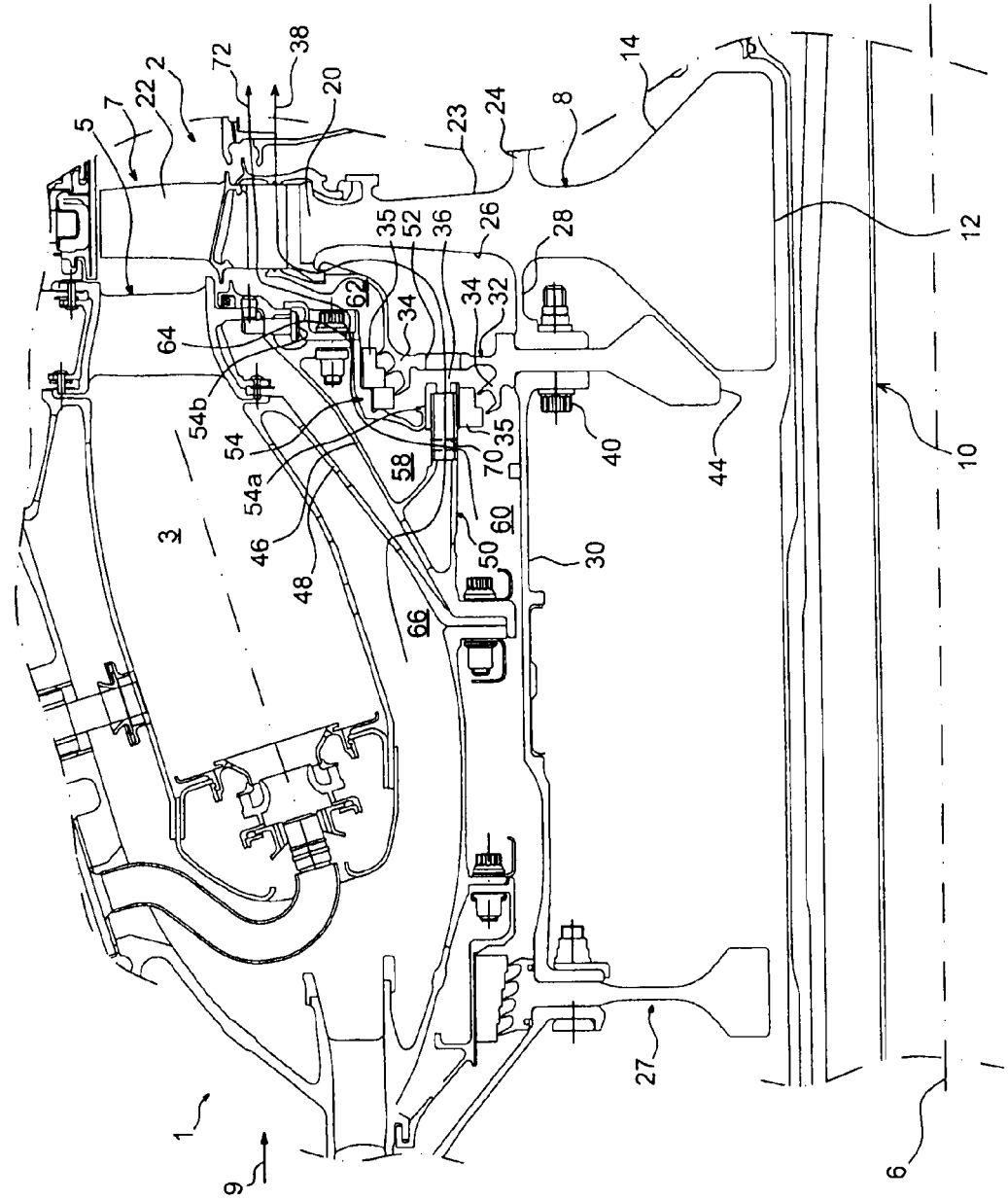
FIG. 1, already described, shows a partial longitudinal sectional view of an aircraft turbine engine, comprising a turbine stator according to a conventional embodiment according to prior art.
Figure 2:
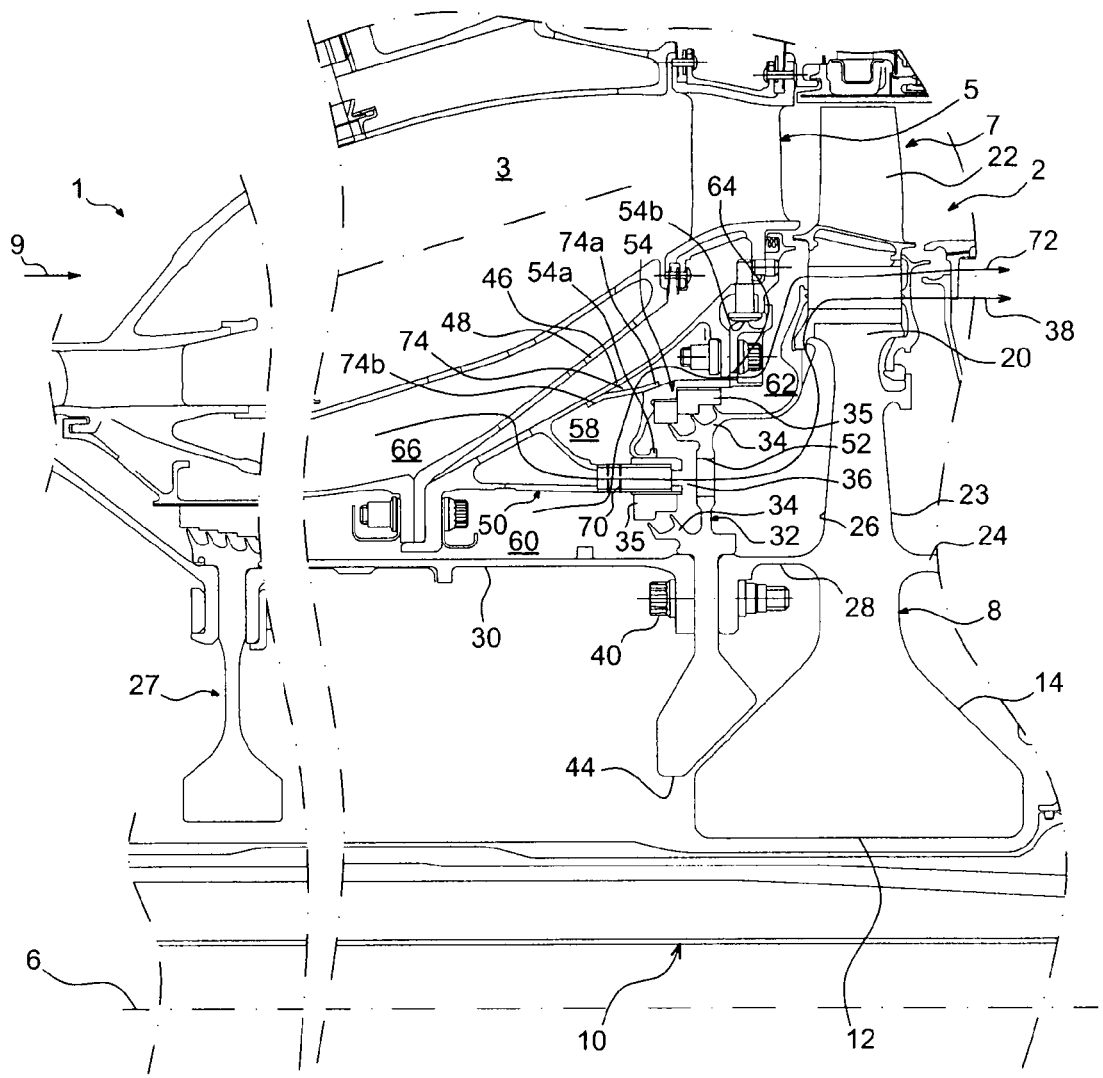
FIG. 2 shows a partial longitudinal sectional view of an aircraft turbine engine, comprising a turbine stator according to a first preferred embodiment of this invention.

Firstly with reference to FIG. 2, the figure shows a turbine stator according to a first preferred embodiment of this invention. This first preferred embodiment, and the following preferred embodiments, preferably use all elements described for the turbine engine according to prior art shown in FIG. 1, the specific feature of the invention being the addition of one or several vibration damping devices placed in the cavity 58 under pressure, each vibration damping device being in contact with the stator wall 46 and the abradable annular element support 54.

Thus, in the figures, elements with the same reference numbers correspond to identical or similar elements.

In the first preferred embodiment shown in FIG. 2, the vibration damping device is in the form of an annular plate 74 placed in the cavity 58 under pressure and centred on the axis 6, this plate having a first end 74a installed fixed on the abradable element support 54, and a second free end 74b, simply held in bearing against the stator wall 46. Naturally, an inversed solution may be envisaged without going outside the scope of the invention.

The first end 74a, located furthest downstream, is an annular end installed fixed by riveting, welding or any other appropriate means onto the support 54. The second free end 74b is held in bearing against the wall 46, while remaining mobile with respect to the wall, such that it can create damping of vibrations by friction between elements 46 and 54. It can also increase the stiffness of the stator as a whole.

In the first preferred embodiment, the half cross-section of the plate 74 as shown in FIG. 2, is globally in the form of three adjacent straight line segments along direction 9, the first and the last segments corresponding to the two ends 74a, 74b respectively, and the intermediate segment creating the link between the other two segments. In this half cross-section, the two straight line segments corresponding to the ends are preferably in linear contact with their associated stator elements 46, 54, the intermediate segment being oriented approximately along direction 9.

Although this is not shown, the plate 74 is preferably perforated to enable air to circulate through it, and therefore to provide an air passage between the two compartments (not referenced) of the cavity 58 under pressure and delimited by this plate. Thus, the leakage air entering the cavity 60 is directed towards the cavity 58 by passing through the holes 70, and then passes through orifices of the plate 74 so as to pass through it, and then goes through the holes 64 to join the cavity 62 and the main flow path, as shown diagrammatically by arrow 72.

Nevertheless, the shape of the annular vibration damping plate may be different as will become clear from the following embodiments that will now be described.

Figure 3A:
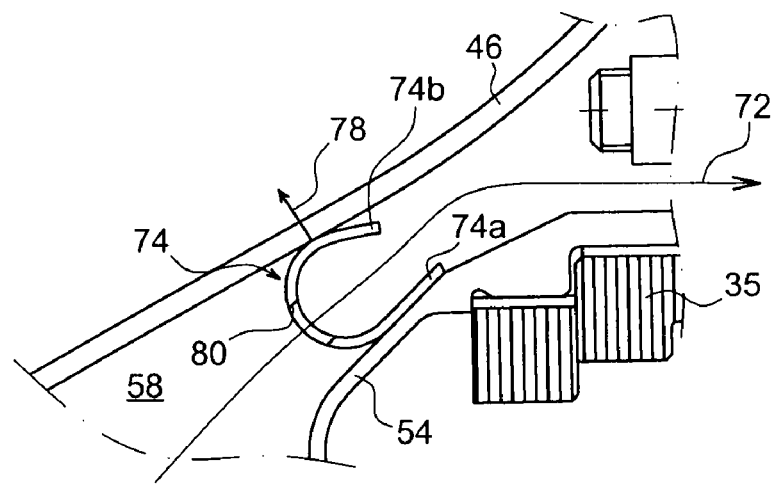
FIG. 3a shows an enlarged view similar to that shown in FIG. 2, with the turbine stator in the form of a second preferred embodiment of this invention.
Figure 3B:
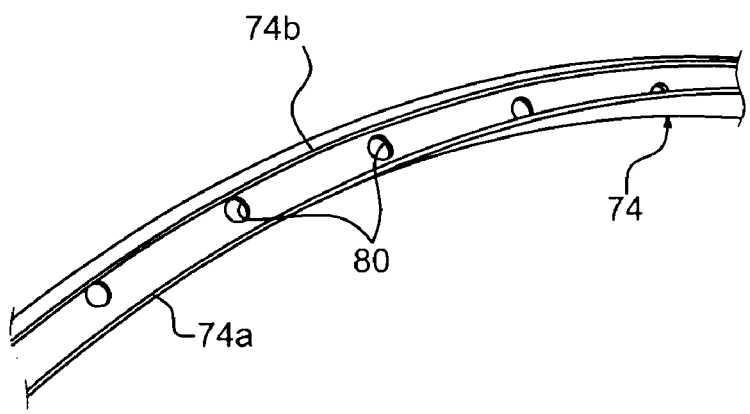

In FIGS. 3a and 3b showing a second preferred embodiment, the half cross-section of the plate 74 has a curved shape and preferably a U or C general shape. The second free end 74b of the C or the U shape is curved such that in a half cross-section, a contact force 78 between this second end 74b and the wall 46 is locally, in other words at the contact point, approximately orthogonal to the surface of the plate.

The plate 74 is shown with its through orifices 80, enabling air to pass from the radially lower compartment to the radially upper compartment of the cavity 58, delimited from each other by this plate 74. As shown in FIG. 3b, orifices 80 may have a circular cross-section.

Figure 4A:
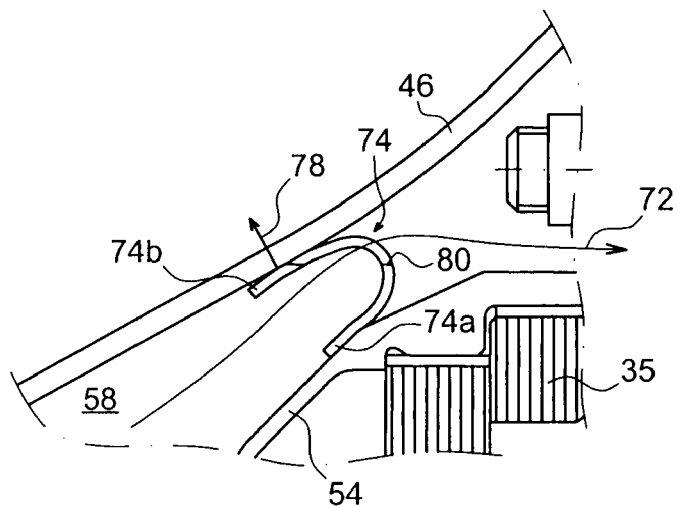
FIG. 4a shows a view similar to that shown in FIG. 3a, with the turbine stator in the form of a third preferred embodiment of this invention.
Figure 4B:
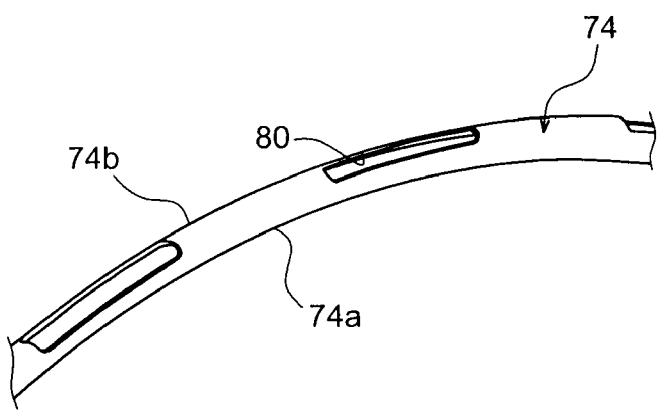

As an alternative, as shown in FIGS. 4a and 4b related to a third preferred embodiment of the invention, the through orifices 80 may have an oblong cross-section, and are always at a certain circumferential distance from each other.

Figure 5A:
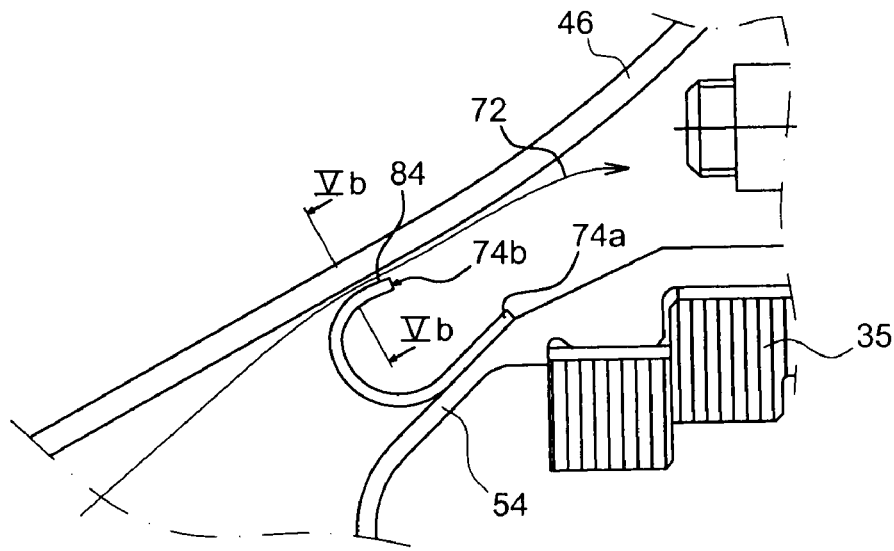
FIG. 5a shows a view similar to that shown in FIG. 3a, with the turbine stator in the form of a fourth preferred embodiment of this invention.
Figure 5B:
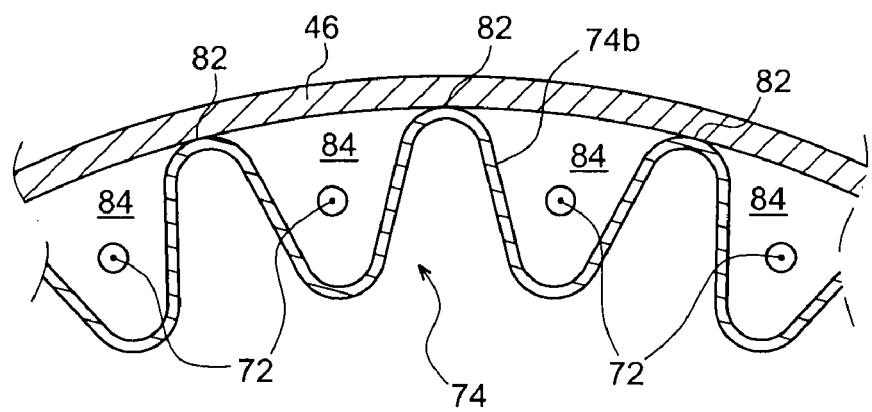

Finally, FIGS. 5a and 5b show a fourth preferred embodiment which shows an alternative solution for fresh air to pass from one of the compartments of cavity 58 to the other. This solution consists of shaping the second end 74b held in bearing against the wall 46 so as to have alternating lobes 82 bearing in contact with this wall 46 and indentations 84 along a circumferential direction, the air then passing through the indentations.

Obviously, those skilled in the art could make various modifications to the invention just described above, solely as non-limitative examples.

The invention claimed is:

1. A turbine stator for an aircraft turbine engine, comprising:
a stator wall supporting a high pressure air injector fixed on the downstream side;
an annular abradable element support designed to be contacted by a sealing labyrinth, the lower radial end of said support arranged on the downstream side of said stator wall being fixed to said high pressure air injector and its upper radial end being fixed to said stator wall, such that said annular support, said stator wall and said high pressure air injector jointly delimit a cavity under pressure,
at least one vibration damping device located in said cavity under pressure, said vibration damping device being in contact with each of the two elements taken among said stator wall and said abradable annular element support,
wherein said vibration damping device is in the form of a plate located in said cavity under pressure and with a first end fixed onto one of the two elements among said stator wall and said annular abradable element support, and a second free end, held in contact with the other of said two elements.

2. A turbine stator according to claim 1, wherein said plate is an annular vibration damping plate centered on a longitudinal axis of the stator and located in said cavity under pressure, said first and second ends to corresponding to annular ends of said plate.

3. A turbine stator according to claim 2, wherein said plate is perforated to allow air circulation through said plate it.

4. A turbine stator according to claim 2, wherein said second end held in contact with said other of the two elements is shaped so has to have lobes bearing on said other of the two elements, and indentations, along a circumferential direction.

5. A turbine stator according to claim 2, wherein said plate has a curved half cross-section.

6. A turbine stator according to claim 5, a half cross-section of said plate has a general shape of a U or C shape.

7. A turbine stator according to claim 2, wherein said turbine stator is designed such that in a half cross-section, a contact force between the second end and said other of the two elements is locally approximately orthogonal to a surface of said plate.

8. A turbine for an aircraft turbine engine comprising a stator according to claim 1.

9. An aircraft turbine engine comprising a turbine according to claim 8.

* * * * *

UNITED STATES PATENT AND TRADEMARK OFFICE
CERTIFICATE OF CORRECTION

PATENT NO. : 8,133,010 B2  
APPLICATION NO. : 12/247462  
DATED : March 13, 2012  
INVENTOR(S) : Mathieu Dakowski et al.

Page 1 of 1

It is certified that error appears in the above-identified patent and that said Letters Patent is hereby corrected as shown below:

Column 6, line 46 (Claim 3), delete "it" after "said plate".

Signed and Sealed this
Twenty-second Day of May, 2012

David J. Kappos
*Director of the United States Patent and Trademark Office*